Patented Dec. 18, 1934

1,984,733

UNITED STATES PATENT OFFICE 1,984,733

PREPARATION COMPRISING GLYCOL SOLUTIONS OF ALKALI METAL SALTS OF BARBITURIC ACID COMPOUNDS

John W. Forbing, Albany, N. Y., assignor to Winthrop Chemical Company, Inc., New York, N. Y., a corporation of New York No Drawing. Application April 29, 1931, Serial No. 533,868

8 Claims. (Cl. 167—52)

The object of my invention is the production of a stable and sterilizable solution of an alkali metal salt of a compound of the barbituric acid series to be used for medicinal purposes. More particularly my invention relates to substantially anhydrous preparations comprising solutions of an alkali metal salt of a compound of the barbituric acid series in a glycol.

The compounds of the barbituric acid series, particularly those which contain aryl, alkyl, alkylene, alkylidene, cyclohexenyl and the like residues are of great importance in medicinal therapy. Of particular importance are, for example, diethyl-barbituric acid, dipropyl-barbituric acid, diallyl-barbituric acid, phenyl-ethyl-barbituric acid, cyclohexenyl-ethyl-barbituric acid etc. and substitution products of these compounds.

The barbituric acids themselves are not sufficiently soluble in water and in the humors of the tissues and in the serum of the animal body. It has been, therefore, necessary to prepare solutions of the alkali metal salts of the barbituric acids in water for injections. The alkali metal salts of the barbituric acids, however, are rather unstable in the presence of water and depending on time and temperature factors, they undergo chemical decomposition, probably by hydrolysis, which fact is naturally, a decided disadvantage in the use of the said substances for medicinal purposes and often renders the preparations even useless and therapeutically inactive.

For these reasons aqueous solutions of the alkali metal salts of the barbituric acids must be freshly prepared before use and cannot be stored and marketed in a manner necessary to guarantee therapeutic reliability.

I have found that by dissolving the alkali metal salts of barbituric acids in glycols in the absence of water stable and sterilizable solutions are obtained which are suitable for medicinal purposes, such as for administration by injection or for rectal use. My new stable preparations, if desired after having been sterilized, can be stored and marketed in suitable containers, such as ampules, etc. or, if intended for rectal use, in the form of suppositories. The fact that the solutions are stable and do not lose their activity by the decomposition or dissociation of the alkali metal salts, permits the storing and marketing of the preparations in ready-made doses convenient for dispensing and speedy administration.

The solvents used for preparing my stable solutions are the dihydric alcohols or glycols, i. e. the compounds which may be regarded as derived from the paraffins by the replacement of two hydrogen atoms by two hydroxyl groups, for instance, ethylene glycol $HO.CH_2.CH_2.OH$, propylene glycol $CH_3.CH(OH).CH_2.OH$, trimethylene glycol $HO.CH_2.CH_2.CH_2.OH$, the four butylene glycols, etc. As is known, the glycols dissolve readily in water. They are soluble in the cellular lipoids and are apparently of little effect and relatively physiologically inactive when injected into the tissue. I prefer to use ethylene glycol or propylene glycol for the purpose set forth.

The process of preparing my new stable solutions may be carried out by dissolving the dry alkali metal salt of the barbituric acid compound in a glycol, preferably in ethylene glycol, in the absence of water, or by dissolving the free barbituric acid compound in the glycol in which the calculated amount of alkali metal has been dissolved under anhydrous conditions, and thereupon sterilizing the solution obtained, if desired. The sterilization may be effected by heating, which is not injurious to the solutions, or by adding suitable germicides. Suppositories may be prepared from the glycol solutions, while excluding water, by means of suitable vehicles, such as sodium stearate.

The glycols have proved to possess in a satisfactory degree the property of dissolving the alkali metal salts of the therapeutically valuable barbituric acids even in the absence of water. It may be noted, however, that the alkali metal salts of the various barbituric acids are not all soluble to the same degree in the above specified solvents and that there may even be such salts as are not sufficiently soluble in glycols to be used for medicinal purposes. Therefore, I wish it to be understood that I do not claim solutions of such barbituric acid alkali metal salts the solubility of which in substantially anhydrous glycols might be sufficiently negligible so as to render such solutions therapeutically inapplicable.

It may be pointed out that it is very essential to avoid any substantial amount of water in the glycol solutions. Glycols containing a relatively large percentage of water may perhaps have a higher dissolving capacity for the alkali metal salts of barbituric acids, but such water-containing solutions are much less stable than the substantially anhydrous solutions, since the water present causes a considerable decrease of the stability of such solutions, probably due to dissociation of the salts.

The following examples serve to illustrate my invention, but the invention is not limited to these examples.

1. 324 grams of dried sodium-phenyl-ethyl-barbituric acid are placed into a suitable container, and 725 cc. of pure ethylene glycol are added. The mixture is then agitated while protecting it against the moisture of the air and, if desired, heated until solution is complete. The solution is then cooled and diluted with a further quantity of the solvent to the desired concentration, for instance, to such volume that one cubic centimeter will contain about 5 grains of sodium-phenyl-ethyl-barbituric acid. The solution may be filtered before or after diluting. The solution may be made sterile by addition of germicides or by heating before, or after, filling it into suitable containers, such as ampules, etc.

The glycol solution can also be prepared in the following manner:

29.3 grams of metallic sodium are dissolved in 725 cc. of pure ethylene glycol, and 295.5 grams of phenyl-ethyl-barbituric acid are added while protecting the mixture against the moisture of the air. When solution is complete it may be diluted, if desired, with a further quantity of the solvent so that, for instance, 1 cc. thereof contains about 5 grains of phenyl-ethyl-barbituric acid.

2. 110 grams of dried sodium-diethyl-barbituric acid are introduced into a suitable container, and 800 cc. of pure ethylene-glycol are added. The salt is dissolved in the solvent, as indicated in Example 1, and the solution is made up, by further addition of the solvent, to such volume that one cubic centimeter contains about 1.7 grains of the above specified sodium salt.

3. 324 grams of dried sodium-cyclohexenyl-ethyl-barbituric acid are placed into a suitable container, and 725 cc. of pure ethylene glycol are added. The salt is dissolved as stated in Example 1, and the solution is diluted to the desired concentration by adding a further quantity of the solvent. For example, a solution may be prepared, each cubic centimeter of which contains about 5 grains of the above specified sodium salt.

4. 324 grams of dried sodium-diallyl-barbituric acid are dissolved in pure ethylene glycol and made up, if desired, to a volume of 1000 cc. by adding the requisite quantity of ethylene glycol.

5. 324 grams of dried sodium-phenyl-ethyl-barbituric acid are dissolved in pure propylene glycol and made up to the desired concentration, for instance, to a volume of 1000 cc., by adding the necessary amount of the solvent.

6. 25.3 grams of sodium-phenyl-ethyl-barbituric acid are dissolved in 37.5 grams of ethylene glycol while heating.

7.5 grams of sodium stearate, or a sufficient quantity of the sodium salt of another suitable fatty acid or a mixture of such salts, are dissolved in 75 grams of ethylene glycol while heating. The two solutions are mixed and strained, or filtered, while still hot and liquid. The liquid mixture is poured into molds of the desired volume, for instance of such volume that on cooling the finished suppository will contain about 5 grains of the sodium salt of phenyl-ethyl-barbituric acid.

7. 8.3 grams of the sodium salt of diallyl-barbituric acid are dissolved in 12.3 grams of ethylene glycol while heating.

A solution of 0.33 grams of stearic acid and 2.46 grams of sodium stearate in 24.1 grams of ethylene glycol is prepared by heating to about 100° C., and the two solutions are mixed, strained, or filtered, while hot and poured into suitable molds, for instance of such a volume that on cooling the finished suppository will contain about 5 grains of the sodium salt of diallyl-barbituric acid.

I claim:

1. As new compositions of matter, stable and sterilizable, substantially anhydrous preparations for medicinal purposes consisting of a substantially anhydrous glycol and dissolved therein an alkali metal salt of a compound of the barbituric acid series.

2. As new compositions of matter, stable and sterilizable, substantially anhydrous preparations for medicinal purposes consisting of substantially anhydrous ethylene glycol and an alkali metal salt of a compound of the barbituric acid series.

3. As a new composition of matter, a stable and sterilizable, substantially anhydrous preparation for medicinal purposes consisting of substantially anhydrous ethylene glycol having in solution therein the sodium salt of phenyl-ethyl-barbituric acid.

4. As a new composition of matter, a stable and sterilizable, substantially anhydrous preparation for medicinal purposes consisting of substantially anhydrous ethylene glycol having in solution therein the sodium salt of diethyl-barbituric acid.

5. As a new composition of matter, a stable and sterilizable, substantially anhydrous preparation for medicinal purposes consisting of substantially anhydrous ethylene glycol having in solution therein the sodium salt of diallyl-barbituric acid.

6. As a new composition of matter, a stable and sterilizable, substantially anhydrous preparation for medicinal purposes consisting of substantially anhydrous ethylene glycol having in solution therein the sodium salt of phenyl-ethyl-barbituric acid in a quantity corresponding to about 5 grains of phenyl-ethyl-barbituric acid in each cubic centimeter of ethylene glycol.

7. As new compositions of matter, stable and sterilizable, substantially anhydrous preparations for medicinal purposes consisting of substantially anhydrous propylene glycol and dissolved therein an alkali metal salt of a compound of the barbituric acid series.

8. As new compositions of matter, stable and sterilizable, substantially anhydrous preparations for medicinal purposes consisting of substantially anhydrous propylene glycol and the sodium salt of phenyl-ethyl-barbituric acid.

JOHN W. FORBING.